United States Patent [19]
Yanagisawa

[11] Patent Number: 5,501,119
[45] Date of Patent: Mar. 26, 1996

[54] ROTARY DRIVE SYSTEM

[75] Inventor: Ken Yanagisawa, Matsumoto, Japan

[73] Assignee: Yugen Kaisha Sozoan, Nagano, Japan

[21] Appl. No.: 284,132

[22] Filed: Aug. 2, 1994

[30] Foreign Application Priority Data

Aug. 9, 1993 [JP] Japan .................................. 5-197113

[51] Int. Cl.$^6$ ................................................ G05G 11/00
[52] U.S. Cl. ...................... 74/490.09; 74/89.15; 108/20
[58] Field of Search ............................ 74/490.09, 89.15; 108/20, 143; 33/1 M; 248/184, 657

[56] References Cited

U.S. PATENT DOCUMENTS

| | | | |
|---|---|---|---|
| 5,165,296 | 11/1992 | Yanagisawa | 74/89.15 X |
| 5,228,358 | 7/1993 | Sakino et al. | 108/20 X |
| 5,311,791 | 5/1994 | Yanagisawa | 74/89.15 X |
| 5,355,744 | 10/1994 | Yanagisawa | 108/20 X |

Primary Examiner—Charles A. Marmor
Assistant Examiner—Peter Kwon
Attorney, Agent, or Firm—Birch, Stewart, Kolasch & Birch

[57] ABSTRACT

The object of the present invention is to provide a rotary drive system, which is capable of simultaneously rotating a plurality of output shafts in the same manner. The rotary drive system of the present invention includes a driving mechanism for moving a moving body around in a plane; a plurality of output shafts being arranged perpendicular to the plane, the output shafts being capable of rotating on their axes at prescribed positions; and a plurality of output levers wherein a first part of each output lever is rotatably connected to each output shaft and a second part thereof is rotatably connected to a face of the moving body, which is parallel to the plane, and wherein the distance between the first and second parts of each output lever is made equal.

17 Claims, 6 Drawing Sheets

FIG.5

ROTARY DRIVE SYSTEM

BACKGROUND OF THE INVENTION

1. Field of the Invention

The present invention relates to a rotary drive system, more precisely relates to a rotary drive system for simultaneously rotating a plurality of output shafts.

2. Description of Background Art

The rotary drive system for simultaneously rotating a plurality of output shafts is used for, for example, a multi-head screwing device, which is capable of simultaneously screwing a plurality of bolts. The multi-head screwing device has a plurality of rotary heads, which are respectively attached to rotatable output shafts, for screwing bolts. The output shafts are respectively rotated by motors, or one motor with a gear transmitting mechanism.

By simultaneously rotating the output shafts and the rotary heads in the same direction at the same speed, a plurality of bolts can be screwed in the same manner.

However, the multi-head screwing device has some disadvantages.

Firstly, in case of using a plurality of motors for rotating the output shafts, all motors must be rotated in the same manner. But it is practically impossible to rotate all motors in the same manner because performance of the motors cannot be equal.

Secondly, in case of using one motor with the gear transmitting mechanism, the number of gear between the motor and each output shaft is mutually different, so mutual time lag of transmitting torque from the motor to each output shaft cannot be avoided. Thus, it is practically impossible to rotate all output shafts in the same manner.

If all output shafts do not rotate in the same manner, the bolts cannot be screwed in the same manner.

SUMMARY OF THE INVENTION

An object of the present invention is to provide a rotary drive system, which is capable of simultaneously rotating a plurality of output shafts in the same manner.

To achieve the object, the present invention has following basic structures.

A first basic structure of the rotary drive system comprises:
- a driving mechanism for moving a moving body in a plane;
- a plurality of output shafts are arranged perpendicular to said plane, said output shafts are capable of rotating on their axes at prescribed positions; and
- a plurality of output levers wherein a first part of each output lever is rotatably connected to each output shaft and a second part thereof is rotatably connected to a face of said moving body, which is parallel to said plane, and wherein the distance between the first and second parts of each output lever is made equal.

On the other hand, a second basic structure of the rotary drive system comprises:
- a moving body are capable of moving around in a plane;
- a plurality of output shafts are arranged perpendicular to said plane, said output shafts are capable of rotating on their axes at prescribed positions;
- a plurality of output levers are provided wherein a first part of each output lever is rotatably connected to each output shaft and a second part thereof is rotatably connected to a face of said moving body, which is parallel to said plane, and wherein the distance between the first and second parts of each output lever is made equal;
- an input shaft is arranged perpendicular to said plane, said input shaft is capable of rotating on its axis at prescribed position; and
- an input lever wherein a first part of said input lever is rotatably connected to said input shaft and a second part thereof is rotatably connected to a face of said moving body, which is parallel to said plane.

In the rotary drive system of the present invention, the output levers are moved around about the output shafts when the moving body is moved around, so that the second parts of the output levers, which are rotatably connected to the moving body, are moved around with circular tracks. By making the distance between the first and second parts of the output levers mutually equal, all of the output shafts can be reliably rotated in the same manner with the round movement of the moving body.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
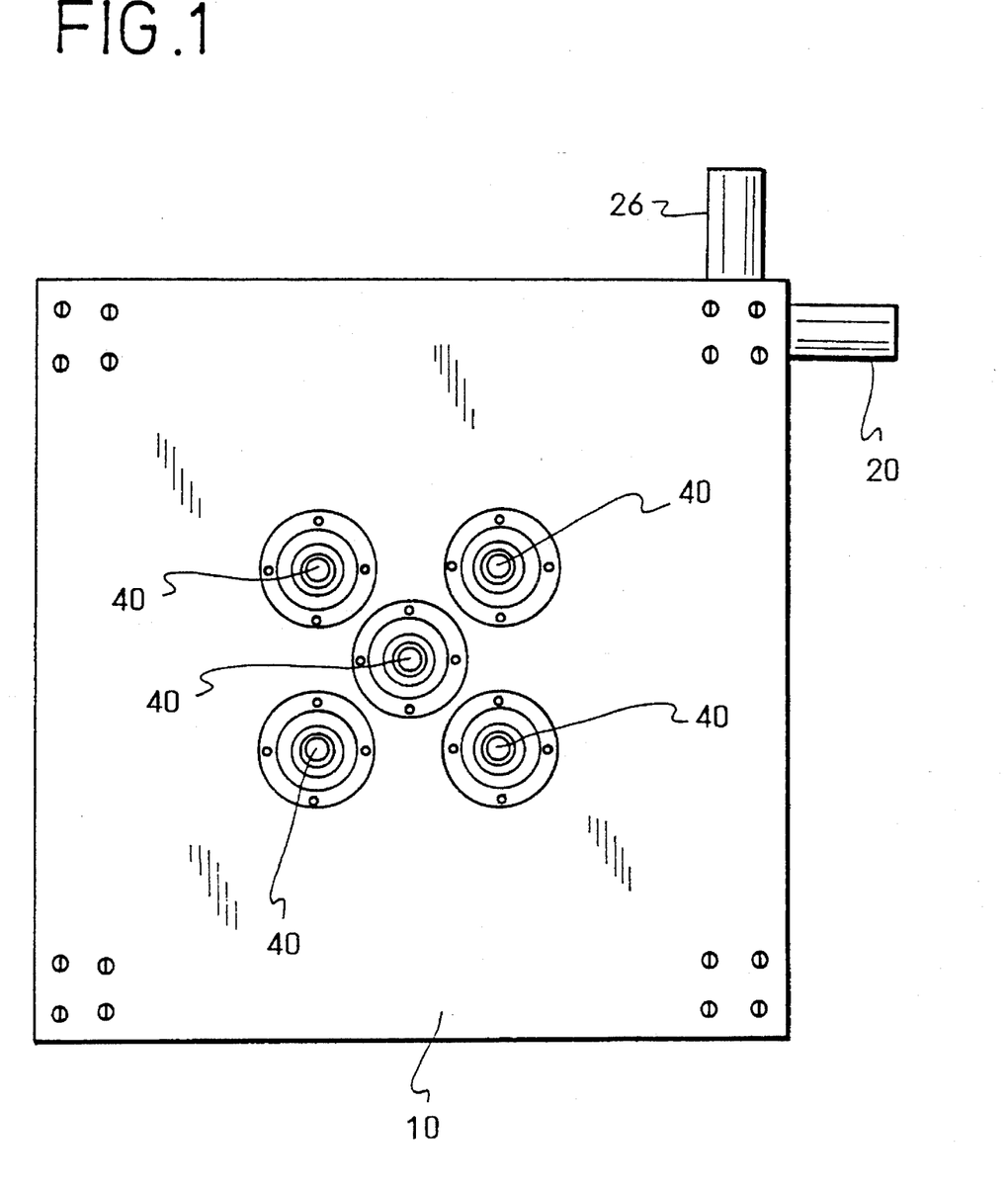
FIG. 1 is a plan view showing a first embodiment of the present invention.
Figure 2:
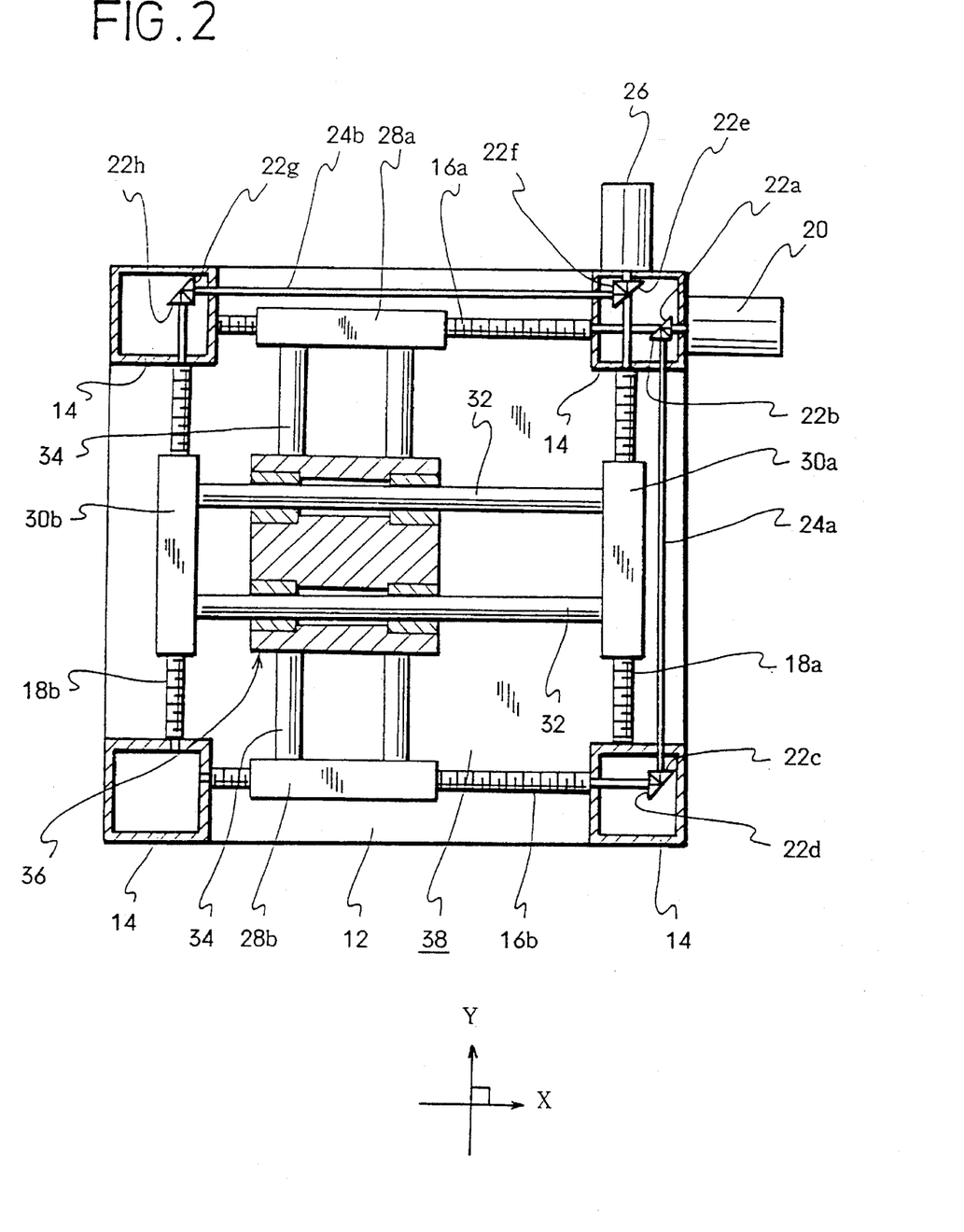
FIG. 2 is a plan sectional view of the first embodiment.
Figure 3:
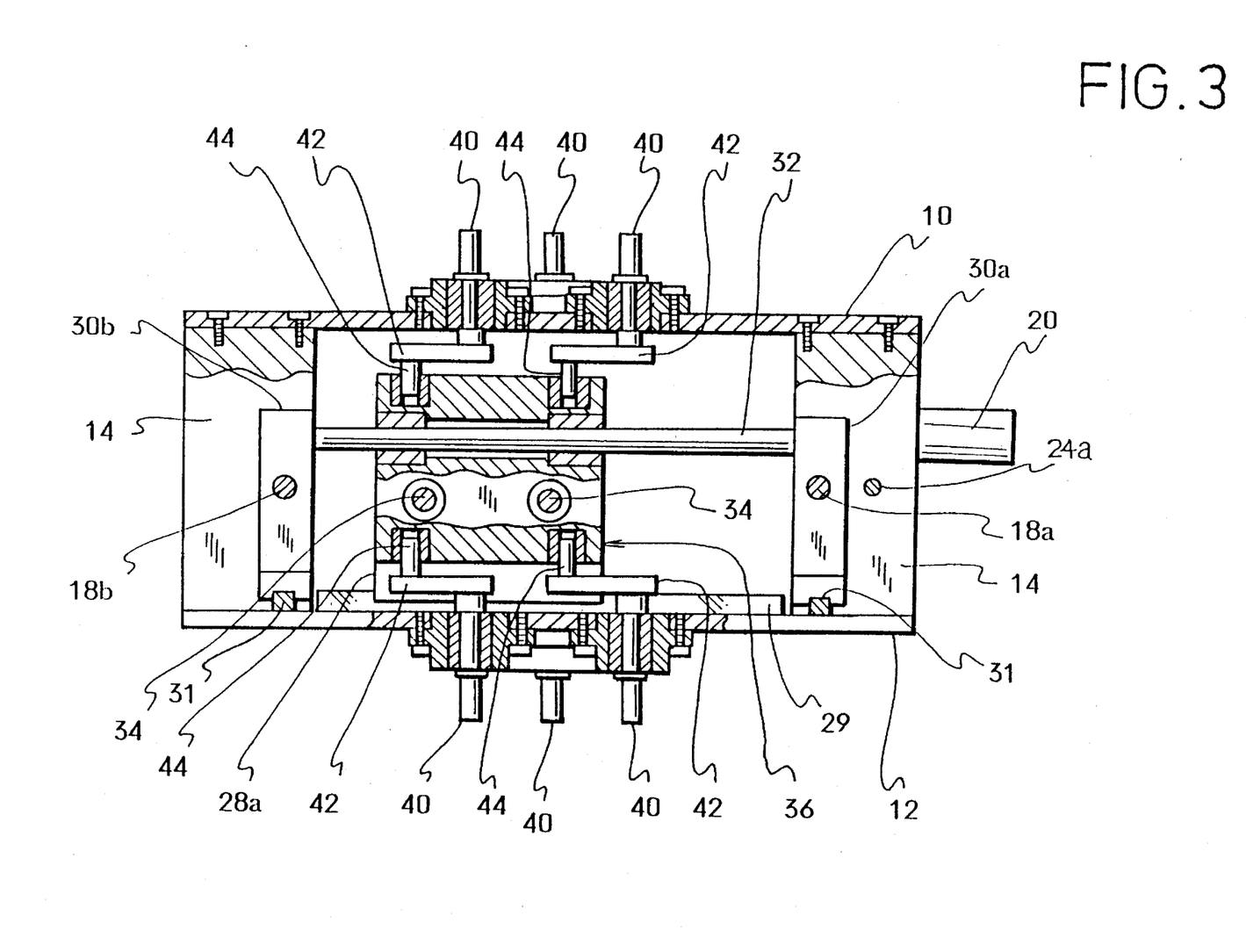
FIG. 3 is a front sectional view of the first embodiment.

A rotary drive system of a first embodiment will be explained with reference to FIGS. 1–3.

An upper plate 10 is made of, for example, metal.

A lower plate 12 is made of, for example, metal.

Gear boxes 14 are provided at each corner. The gear boxes 14 connect the upper plate 10 and the lower plate 12 to each other. Bevel gears, which will be explained later, are accommodated in the gear boxes 14.

A pair of X-ball screws 16a and 16b are provided in parallel. The X-ball screws 16a and 16b are arranged in an X-direction. The X-ball screws 16a and 16b are spanned between the gear boxes 14 and are scapable of rotating about their axes.

A pair of Y-ball screws 18a and 18b are provided in parallel. The Y-ball screws 16a and 16b are arranged in a Y-direction, which is perpendicular to the X-direction. The Y-ball screws 18a and 18b are spanned between the gear boxes 14 and are capable of rotating about their axes.

An X-motor 20 is a servo motor. The X-motor 20 directly rotates the X-ball screw 16a. On the other hand, the X-ball screw 16b is rotated by the motor 20 via a transmitting mechanism including bevel gears 22a, 22b, 22c and 22d and a connecting shaft 24a. With this structure, the X-ball screws 16a and 16b can be rotated in the same direction at the same speed.

A Y-motor 26 is a servo motor. The Y-motor 26 directly rotates the Y-ball screw 18a. On the other hand, the Y-ball screw 18b is rotated by the motor 20 via a transmitting mechanism including bevel gears 22e, 22f, 22g and 22h and a connecting shaft 24b. With this structure, the Y-ball screws 18a and 18b can be rotated in the same direction at the same speed.

The X-ball screws 16a and 16b are respectively screwed with X-nuts 28a and 28b. Lower end parts of the X-nuts 28a and 28b are slidably engaged with a pair of X-fixed guides 29, which are fixed on an upper face of the lower plate 12 and which are arranged in the X-direction. Engaging with the X-fixed guides 29, the X-nuts 28a and 28b are prevented to rotate on the X-ball screws 16a and 16b, so that the X-nuts 28a and 28b are capable of moving in the X-direction along the X-fixed guides 29 with the rotation of the X-ball screws 16a and 16b.

The Y-ball screws 18a and 18b are respectively screwed with Y-nuts 30a and 30b. Lower end parts of the Y-nuts 30a and 30b are slidably engaged with a pair of Y-fixed guides which are fixed on an upper face of the lower plate 12 and which are arranged in the Y-direction. Engaging with the Y-fixed guides 31, the Y-nuts 30a and 30b are prevented to rotate on the Y-ball screws 18a and 18b, so that the Y-nuts 30a and 30b are capable of moving in the Y-direction along the Y-fixed guides 31 with the rotation of the Y-ball screws 18a and 18b.

An X-rod 32 is arranged in the X-direction, and both ends are respectively fixed to the Y-nuts 30a and 30b. Thus, the X-rod 32 can be moved in the Y-direction with the movement of the Y-nuts 30a and 30b. The X-rod 32 can be maintained parallel to the X-axis while moving in the Y-direction.

A Y-rod 34 is arranged in the Y-direction, and both ends are respectively fixed to the X-nuts 28a and 28b. Thus, the Y-rod 34 can be moved in the x-direction with the movement of the X-nuts 28a and 28b. The Y-rod 34 can be maintained parallel to the Y-axis while moving in the X-direction.

The X-rod 32 and the Y-rod 34 are pierced through bearings in a moving body 36. The moving body 36 is capable of moving on the X-rod 32 and the Y-rod 34. Thus, the moving body 36 is moved in the X-direction with the movement of the X-rod 32 in the Y-direction; the moving body 36 is moved in the Y-direction with the movement of the Y-rod 34 in the X-direction. By combining the movement of the moving body 36 in the X- and Y-directions, it is possible to move the moving body 36 in a plane 38, which is rounded by the X-ball screws 16a and 16b and the Y-ball screws 18a and 18b. In the present embodiment, the moving body 36 can be moved round in the plane 38 with a true circular track by computer-controlling the X-motor 20 and the Y-motor 26. While the circular movement, the moving body 36 can be preventing from revolving about its axes because the X-rod 32 and the Y-rod 34 are pierced through the moving body 36.

Note that, a driving mechanism for moving the moving body 36 around in the plane 38 includes the X-ball screws 16a and 16b, the Y-ball screws 18a and 18b, the X-motor 20, the Y-motor 26, the X-nuts 28a and 28b, the Y-nuts 30a and 30b, the bevel gears 22a, 22b, 22c and 22d, the connecting shaft 24a, the bevel gears 22e, 22f, 22g and 22h, the connecting shaft 24b, the X-rod 32 and the Y-rod 34. The driving mechanism is not limited to above described structure. For example, a belt driving mechanism shown in the U.S. Pat. No. 4,995,277 may be employed as the driving mechanism for the present invention.

Output shafts 40 are rotatably pierced through the upper plate 10 and the lower plate 12. The output shafts 40 are arranged perpendicular to the plane 38, and they can rotate about their axes at provided positions. In the present embodiment, for example, there are ten out shafts 40: five in the upper plate 10 and five in the lower plate 12. In the present invention, two or more output shafts 40 are required, and they may be provided on the upper or lower side of the plane 38.

A first end part of each output lever 42 is fixed to one end of each output shaft 40. A second part of each output lever 42 is rotatably connected to an upper face or a bottom face of the moving body 36, which is parallel to the plane 38, by a connecting rod 44. Because a set of the output lever 42 the connecting rod 44 is formed into a crank, the output shafts 40 can be rotated about their axes at the provided positions when the moving body 36 is moved around in the plane 38. In every output lever 42, the distance between the first end part, at which the output shaft 40 is connected, and the second end part, at which the connecting rod 44 is connected, is made equal. Thus, all output levers 44 can be moved around in the same direction at the same speed. Note that, the diameter of the circular track of the moving body 36 is defined by the distance between the first and the second end parts of the output levers 42.

If rotary heads for screwing bolts are respectively attached to each output shaft 40, a multi-head screwing device, which is capable of simultaneously screwing the bolts, can be realized, so the rotary drive system of the present invention can be employed for wide use.

Successively, the action of the rotary drive system of the first embodiment will be explained.

In the present embodiment, the rotary drive system is controlled by a computer control system. Namely, the rotation of the X- and the Y-motors 20 and 26 are controlled by the computer control system. The computer control system controls the X- and the Y-motors 20 and 26 so as to move the moving body 36 around in the plane 38 with the circular track. The X-rod 32 can be maintained parallel to the X-axis while moving in the Y-direction; the Y-rod 34 can be maintained parallel to the Y-axis while moving in the X-direction. Therefore, the moving body 36 can be moved around without rotating its own axis.

By rotatably connecting the connecting rods 44 of the output levers 42 to the moving body 36, by fixing the output shafts 40 to the output levers 42 and by rotatably attaching the output shafts 40 to the upper and the lower plates 10 and 12, the output levers 42 move around the output shafts 40 together with the moving body 36. As a result of the round movement of the output levers 42, the output shafts are rotated about their axes at the provided positions. Because the output levers 42 have the same length, all output shafts 40 can be rotated in the same direction at the same speed.

In case where the rotary drive system of the present embodiment is employed together with the multi-head screwing device, the rotary heads, which are respectively attached to the output shafts 40, can be rotated in the same direction at the same speed, so that a plurality of bolts can be screwed in the same manner.

Figure 4:
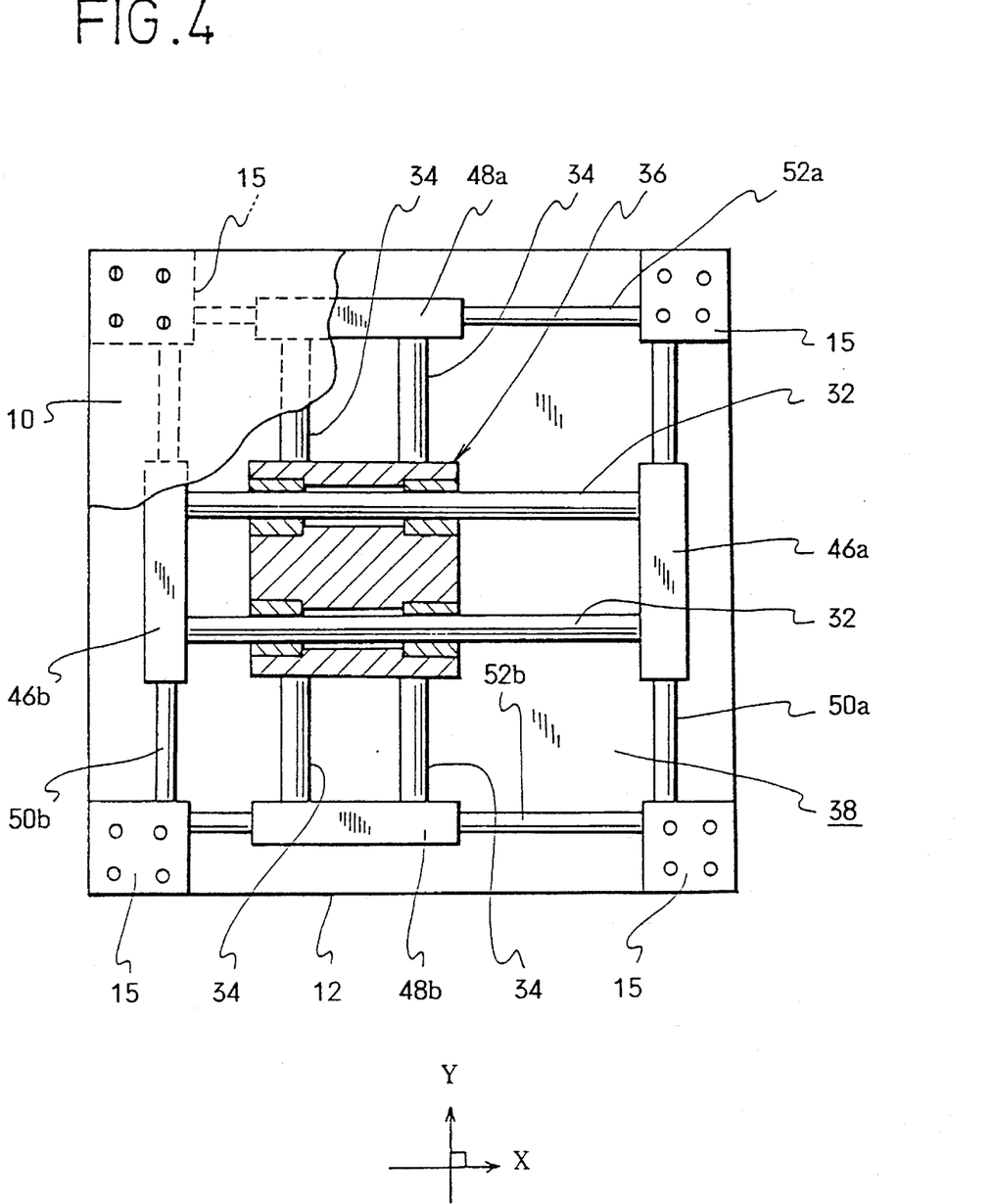
FIG. 4 is a partial plan sectional view of a second embodiment.
Figure 5:
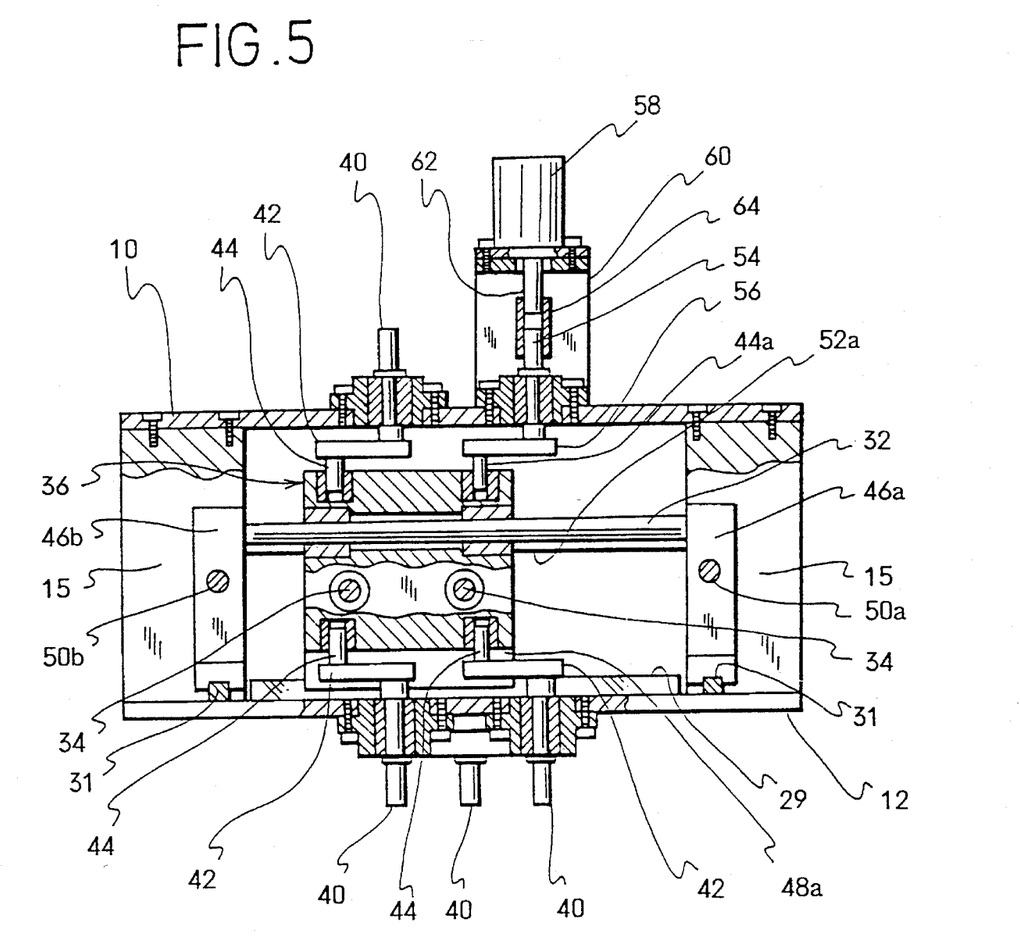
FIG. 5 is a front sectional view of the second embodiment.

A second embodiment will be explained with reference to FIGS. 4 and 5. Note that, constituting members employed in the first embodiment are assigned the same symbols and their explanation will be omitted.

In the first embodiment, the rotary drive system has the driving mechanism, which includes the X- and the Y-motors 20 and 26, the moving body 36, etc. On the other hand, the rotary drive system of the second embodiment is capable of the output shafts 40 without using the driving mechanism of the first embodiment.

The moving body 36 is not moved by the driving mechanism, which is shown in the first embodiment.

Both ends of the X-rod 32 are respectively fixed to Y-sliders 46a and 46b. The Y-sliders 46a and 46b respectively cover a pair of Y-fixed guide shafts 50a and 50b, which are respectively spanned between corner blocks 15. The Y-sliders 46a and 46b are capable of sliding on the Y-fixed guide shafts 50a and 50b in the Y-direction.

Both ends of the Y-rod 34 are respectively fixed to X-sliders 48a and 48b. The X-sliders 48a and 48b respectively cover a pair of X-fixed guide shafts 52a and 52b, which are respectively spanned between corner blocks 15. The X-sliders 48a and 48b are capable of sliding on the X-fixed guide shafts 52a and 52b in the X-direction.

With this structure, the moving body 36 can be moved around in the plane 38 by receiving external driving force. By piercing the X- and the Y-rods 32 and 34 through the moving body 36, the moving body 36 can be moved around without rotating about its axis.

An input shaft 54 is rotatably pierced through the upper plate 10. The input shaft 54 is arranged perpendicular to the plane 38 and is capable of rotating about its axis at the provided position. The input shaft 54 may be provided to not only the upper plate 10 but also the lower plate 12. In the case wherein a plurality of input shafts 54 are provided, they may be provided on both plates 10 and 12. Note that, in the second embodiment, one of the output shafts 40 of the first embodiment is used as the input shaft 54.

A first end part of an input lever 56 is fixed to one end of the input shaft 54. A second part of the input lever 56 is rotatably connected to the upper face of the moving body 36, which is parallel to the plane 38, by a connecting rod 44a. Because the output lever 42 and the connecting rod 44 are formed into a crank, the moving body 36 can be moved round the input shaft 54 in the plane 38 when the input shafts 54 is rotated about its axis at the provided positions. The distance between the first end part of the input lever 56, at which the input shaft 54 is connected, and the second end part thereof, at which the connecting rod 44a is connected, is made equal to that of the output levers 42.

A servo motor 58 rotates the input shaft 54. The motor 58 is fixed to the upper plate 10 by a frame 60. An output motor shaft 62 of the motor 58 is connected to the input shaft 54 by a coupler 64. Note that, in the second embodiment, a servo motor is employed as a rotary driving mechanism for a precise control of the rotation of the input shaft 54 but an oil motor, an engine, etc. may be employed as the rotary driving mechanism.

Successively, the action of the rotary drive system of the second embodiment will be explained.

In the present embodiment, the rotary drive system is controlled by a computer control system. Namely, the rotation of the motor 58 is controlled by the computer control system. The computer control system controls the motor 58 so as to transmit the rotational torque to the input shaft 54 via the motor shaft 62. When the input shaft 54 is rotated, the moving body 36 is moved round in the plane 38 together with the input lever 56.

When the motor 58 is driven, the X-rod 32 is moved in the Y-direction and can be maintained parallel to the X-axis; the Y-rod 34 is moved in the X-direction and can be maintained parallel to the Y-axis. Therefore, the moving body 36 can be moved around without rotating its own axis.

By rotatably connecting the connecting rods 44 of the output levers 42 to the moving body 36, by fixing the output shafts 40 to the output levers 42 and by rotatably attaching the output shafts 40 to the upper and the lower plates 10 and 12, the output levers 42 move around the output shafts 40 together with the moving body 36. As a result of the round movement of the output levers 42, the output shafts 40 are rotated about their axes at the provided positions. Because the output levers 42 have same the length, all output shafts 40 can be rotated in the same direction at the same speed.

In the second embodiment, the rotary drive system has one input shaft 54, which is provided to the upper plate 10, two or more input shafts 54 may be provided to the upper plate 10 and/or the lower plate 12. If a plurality of rotary driving mechanism are employed, output torque of the output shafts 40 can be increased.

In the second embodiment, the X- and the Y-rods 32 and 34 are pierced through the moving body 36 so as to stably move the moving body 36 at a high speed and to prevent vibration. But the X- and the Y-rods 32 and 34 need not be pierced through the moving body 36.

Figure 6:
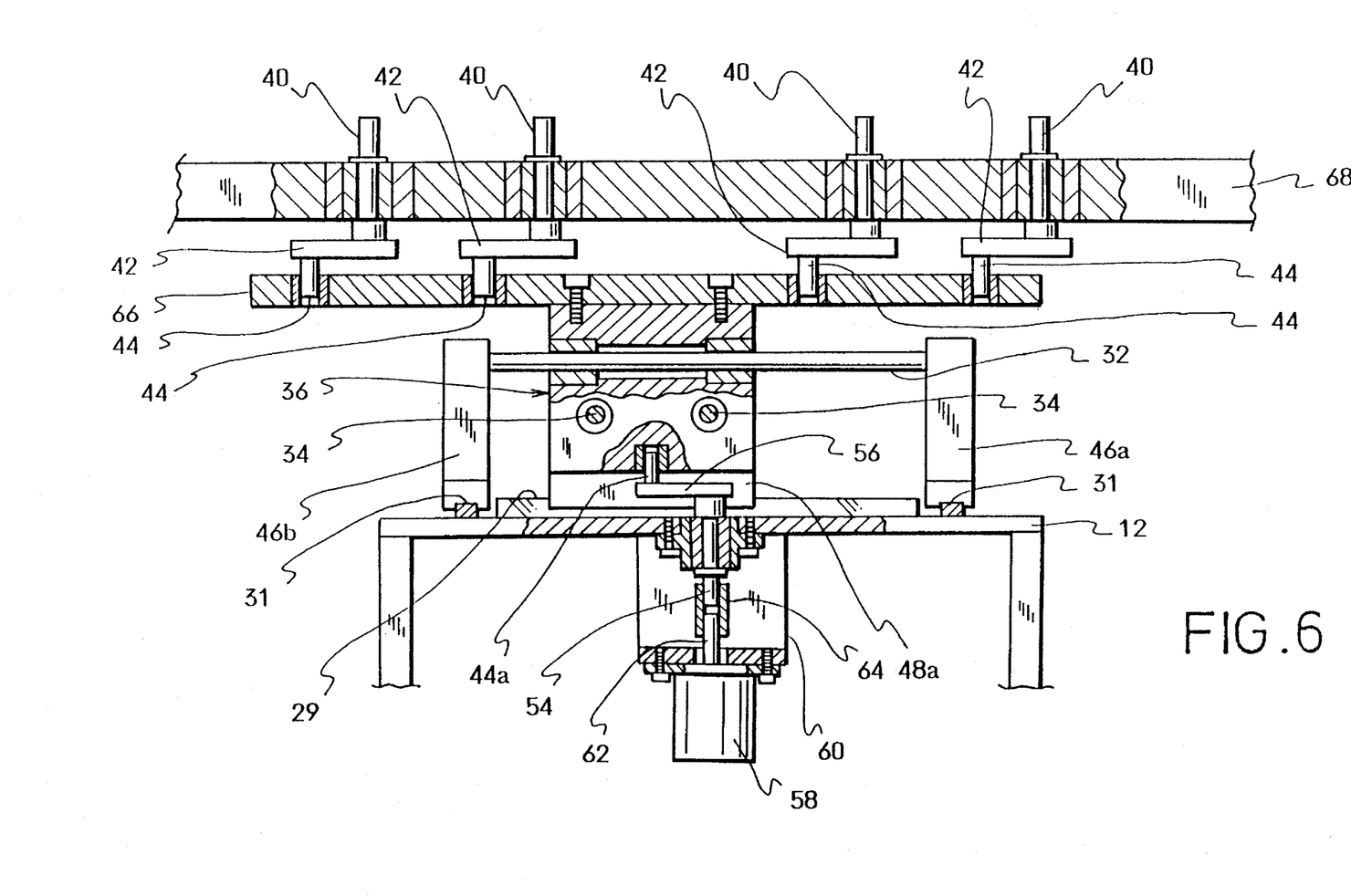
FIG. 6 is a front sectional view of a third embodiment.

A third embodiment will be explained with reference to FIG. 6. Note that, constituting members employed in the former embodiments are assigned the same symbols and their explanation will be omitted.

The third embodiment is a modification of the second embodiment.

In the third embodiment, the upper face of the moving body 36 is made greater so as to have a greater number of output shafts 40. A table 66 is fixed on the upper face of the moving body 36, so that it can be moved round together with the moving body 36.

The connecting rods 44 of the output levers 42 are rotatably connected to an upper face of the table 66.

The output shafts 40 may be provided to the upper plate 10 as shown in the former embodiments but, in the third embodiment, they are rotatably provided to an external fixed member 68.

The X-sliders 48a and 48b (the X-slider 48b is not shown in FIG. 6) and the Y-sliders 46a and 46b are capable of sliding in the X- and the Y-directions on the fixed guides 29 and 31.

In the third embodiment, as well as the second embodiment, when the motor 58 is driven, the moving body 36 can be moved round without rotating its own axis. As a result of the round movement of the moving body 36, the output shafts 40 are rotated about their axes at the provided positions. Because the output levers 42 have the same length, all output shafts 40 can be rotated in the same direction at the same speed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A rotary drive system, comprising:

a driving mechanism for moving a moving body around in a plane;

a plurality of output shafts being arranged perpendicular to said plane, said output shafts being capable of rotating on their axes at prescribed positions; and a plurality of output levers wherein a first part of each output lever is rotatably connected to each output shaft and a second part thereof is rotatably connected to a face of said moving body, which is parallel to said plane, and wherein the distance between the first and second parts of each output lever is made equal.

2. The rotary drive system according to claim 1, said driving mechanism comprising:

a pair of first fixed guides being arranged in a first direction;

a pair of second fixed guides being arranged in a second direction, which is perpendicular to the first direction;

a first moving guide being arranged in the first direction, ends of said first moving guide being capable of moving in the second direction along said second fixed guides;

a second moving guide being arranged in the second direction, ends of said second moving guide being capable of moving in the first direction along said first fixed guides;

first moving means for moving said second moving guide in the first direction; and second moving means for moving said first moving guide in the second direction, wherein said moving body is capable of moving in the first and second directions on said first and second moving guides.

3. The rotary drive system according to claim 2, said first moving means comprising:

a first ball screw being arranged in the first direction, said first ball screw being screwed with the end section of said second moving guide; and a first motor for rotating said first ball screw, and said second moving means comprising:

a second ball screw being arranged in the second direction, said second ball screw being screwed with the end section of said first moving guide; and a second motor for rotating said second ball screw.

4. The rotary drive system according to claim 2, wherein said first and second moving guides are rods, which are pierced through said moving body.

5. The rotary drive system according to claim 1, wherein said output shafts are provided above said plane.

6. The rotary drive system according to claim 1, wherein said output shafts are provided below said plane.

7. The rotary drive system according to claim 1, wherein said output shafts are provided above and below said plane.

8. A rotary drive system, comprising:

a moving body being capable of moving around in a plane;

a plurality of output shafts being arranged perpendicular to said plane, said output shafts being capable of rotating on their axes at prescribed positions;

a plurality of output levers wherein a first part of each output lever is rotatably connected to each output shaft and a second part thereof is rotatably connected to a face of said moving body, which is parallel to said plane, and wherein the distance between the first and second parts of each output lever is made equal;

an input shaft being arranged perpendicular to said plane, said input shaft being capable of rotating on its axis at prescribed position; and an input lever wherein a first part of said input lever is rotatably connected to said input shaft and a second part thereof is rotatably connected to a face of said moving body, which is parallel to said plane.

9. The rotary drive system according to claim 8, further comprising a rotary driving mechanism for rotating said input shaft.

10. The rotary drive system according to claim 9, wherein said rotary driving mechanism is a motor.

11. The rotary drive system according to claim 8, further comprising:

a pair of first fixed guides being arranged in a first direction;

a pair of second fixed guides being arranged in a second direction, which is perpendicular to the first direction;

a first moving guide being arranged in the first direction, ends of said first moving guide being capable of moving in the second direction along said second fixed guides; and a second moving guide being arranged in the second direction, ends of said second moving guide being capable of moving in the first direction along said first fixed guides, wherein said moving body is capable of moving in the first and second directions on said first and second moving guides.

12. The rotary drive system according to claim 11, wherein said first and second moving guides are rods, which are pierced through said moving body.

13. The rotary drive system according to claim 8, wherein said output shafts are provided above said plane.

14. The rotary drive system according to claim 8, wherein said output shafts are provided below said plane.

15. The rotary drive system according to claim 8, wherein said output shafts are provided above and below said plane.

16. The rotary drive system according to claim 8, wherein said output shafts are rotatably provided to a fixed member, which is fixed apart from said moving body.

17. The rotary drive system according to claim 16, wherein said fixed member is provided above said plane, and said input shaft is provided below said plane.

* * * * *